US009200845B2

(12) United States Patent
Miani et al.

(10) Patent No.: US 9,200,845 B2
(45) Date of Patent: Dec. 1, 2015

(54) ARC METALLURGIC FURNACE SLAGGING DOOR (75) Inventors: Stefano Miani, Premariacco (IT); Bruno Rubeo, Remanzacco (IT)

(73) Assignee: SMS CONCAST ITALIA S.p.A., Udine (IT)

( * ) Notice: Subject to any disclaimer, the term of this patent is extended or adjusted under 35 U.S.C. 154(b) by 1414 days.

(21) Appl. No.: 12/988,640

(22) PCT Filed: Feb. 5, 2010

(86) PCT No.: PCT/EP2010/051434
§ 371 (c)(1),
(2), (4) Date: Oct. 20, 2010

(87) PCT Pub. No.: WO2010/094584
PCT Pub. Date: Aug. 26, 2010

(65) Prior Publication Data
US 2011/0038391 A1    Feb. 17, 2011

(30) Foreign Application Priority Data
Feb. 19, 2009   (IT) .............................. MI2009A0227

(51) Int. Cl.
*F27D 1/00* (2006.01)
*C21B 9/10* (2006.01)
*F27D 1/18* (2006.01)
*F27B 3/08* (2006.01)
*F27D 3/15* (2006.01)

(52) U.S. Cl.
CPC .............. *F27D 1/1858* (2013.01); *F27B 3/085* (2013.01); *F27D 3/159* (2013.01); *F27D 3/1536* (2013.01)

(58) Field of Classification Search
CPC .............. F27B 3/10; F27B 3/19; F27B 3/085; F27B 3/14; F27D 1/1858; F27D 3/1536; F27D 3/159; F27D 3/14; F27D 3/15
USPC .............. 373/71, 72, 75, 79, 84, 76; 266/135, 266/272, 45; 432/250, 237
See application file for complete search history.

(56) References Cited

U.S. PATENT DOCUMENTS

| 2,254,900 | A | * | 9/1941 | Lessmann | 110/173 R |
| 3,305,350 | A | * | 2/1967 | Aitchison | 266/162 |
| 5,603,194 | A | * | 2/1997 | Fridlyand et al. | 52/515 |
| 6,000,938 | A | | 12/1999 | Melanowicz | |
| 2007/0290420 | A1 | * | 12/2007 | Wunsche | 266/271 |

FOREIGN PATENT DOCUMENTS

| JP | 61-15078 | 1/1986 |
| WO | WO2006/016201 | 2/2006 |
| WO | WO2007/147248 | 12/2007 |

* cited by examiner

*Primary Examiner* — Hung D Nguyen
(74) *Attorney, Agent, or Firm* — Jordan IP Law, LLC; Todd A. Vaughn (57) ABSTRACT An arc metallurgic furnace slagging door having an upper panel and a lower panel substantially vertically aligned with the upper panel, the panels being placed in front of a tunnel giving access to a furnace melting pot and in front of the slagging door for closing the tunnel. The upper panel is outwardly inclined with respect to the tunnel, and movable between a closed position and an open position which permits remarks and interventions to be conducted on molten metal. The lower panel is movable independently with respect to the upper panel between closing, cleaning and slagging positions.

20 Claims, 6 Drawing Sheets

ARC METALLURGIC FURNACE SLAGGING DOOR

CROSS REFERENCE TO PRIOR APPLICATIONS

The present application is a National Stage Application of PCT International Application No. PCT/EP2010/05143 (filed on Feb. 5, 2010), under 35 U.S.C. 371, which claims priority to Italian Patent Application No. MI2009A000227 (filed on Feb. 19, 2009), which are each hereby incorporated by reference in their respective entireties.

FIELD OF THE INVENTION

The present invention relates to an arc metallurgic furnace provided with a slagging door, comprising, according to an embodiment, a lower movable panel serving as a slag remover and as a scrap pusher and a top movable panel, which can be opened to carry out remarks and interventions on molten metal, and related control apparatus of the slagging door.

BACKGROUND OF THE INVENTION

A steel production cycle is known, complying with the secondary steel making method, which uses iron scrap for regenerating it and obtaining new steel. The core of the secondary steel making is the Electric Arc Furnace (EAF), wherein the scrap is molten.

A common electric arc furnace basically comprises a stack, composed by a melting pot for collecting the molten steel, a covering roof which can be opened, three electrodes, which lower through the roof and a fume plant. In the arc furnace, a slagging door is provided, typically located on the vertical wall of the furnace stack in communication with the interior of the furnace through a tunnel. Such a slagging door is used to periodically remove the slag, as well as for other activities, such as loading additives, collecting samples, measuring the temperature, inserting ports and oxygen injectors, and also for inspecting the interior of the furnace.

A furnace according to the prior art is disclosed in WO 2006/016201 A.

The present invention is directed both to optimizing the slag removal operation, which tends to build up in the tunnel, if any, or at the slagging door threshold, as well as to the separation of slag splashes, which are projected on the closing panel of the slagging door, and to pushing the scrap building up at the tunnel so to allow an easy access and the vision of the interior of the furnace.

Slag removal systems are already known, made of horizontally-moving pushing elements or horizontally rocking arms, whose efficiency is insufficient, though, as well as vertically moving closing panels of the slagging door, on which, however, the slag separation action is poor.

Therefore, it is the object of the present invention to provide an apparatus, which carries out the slag removal, the threshold cleaning and the scrap pushing actions, as well as the slag separation from the top closing panel of the slagging door, eliminating all the drawbacks of the prior art and optimizing said operations.

SUMMARY OF THE INVENTION

According to an example, such an object and such tasks are achieved in an electric arc furnace, which has a cooled slagging door, formed by a lower movable slagging panel and a top movable panel, also cooled, apt to enable several cleaning and control operations of the molten metal, addition of additives and oxygen and other operations requiring access to the melting pot.

In particular, such a top panel is slightly outwardly inclined and suitable to move itself toward outside the furnace and upward, while keeping substantially such an inclination in respect to the furnace wall. The top panel slides along an inclined guide, under the action of any suitable actuator, which acts on the bearing carrier of the panel. The movement can be simply obtained by means of hydraulic cylinders or by means of a chain, which slides on gear rings. The chains and the gear rings are connected by a drive shaft, which make movement integral and synchronous. The top panel movement outward and upward causes the separation of the slag, which are splashed thereon during the metal melting, due to the action of a scraper.

The lower panel forming the real slagging door, in turn, carries out a composite oscillatory movement along the horizontal axes, as a dredging element, in order to penetrate inside the furnace, settle on the slag and then move back, thereby dragging said slag outwards. Such dredging movements iterate until the slag is completely removed. According to a preferred embodiment, the dredging movement can be inverted, in order to carry out, instead, a push into the furnace, to clear materials obstructing the threshold, such as scrap. The lower panel of the slagging door is operated, through an unequal-armed parallelogram, by another hydraulic actuator. The hydraulic actuators can comprise one or more hydraulic cylinders or hydraulic motors with or without a brake, as needed.

BRIEF DESCRIPTION OF THE DRAWINGS

Further features and advantages of the present invention will be more evident from the description of some embodiments, provided below only as a way of example, and not limitative, with reference to the following accompanying figures, wherein.

DETAILED DESCRIPTION OF THE INVENTION

The electric arc furnace comprises, in a way known per se and therefore not illustrated, a stack formed by a rocking melting pot on a horizontal axis, coated by a refractory material and adapt to contain molten steel, a roof which can be opened, adapt to cover the melting pot and to allow loading a steel scrap mass, a plurality of electrodes adapt to melt the steel scrap mass, and means for placing the melting pot on a base.

In referring to FIGS. 1A-1H, a plurality of cooling pipe panels is denoted by 12, which cover the furnace stack liner. In the front part of the furnace, a short molten metal tapping tunnel 14 is provided, covered by cooling pipes. Such a short tapping tunnel 14, according to an embodiment of the present invention, during the melting process is closed in the lower part, by a slagging door split, according to the invention, in a lower panel 16 and in a top panel 18, both formed by cooled elements, for example a plurality of water circulation cooling pipes. The top panel 18 forms the control and adjusting panel of the characteristics of the molten mass, whereas the lower panel 16 has the function of removing the slag, pushing the scrap and, of course, it cooperates for closing the tapping tunnel. Such top and lower panels are mounted on a frame 20, which supports an inclined guide 22.

Figure 4:
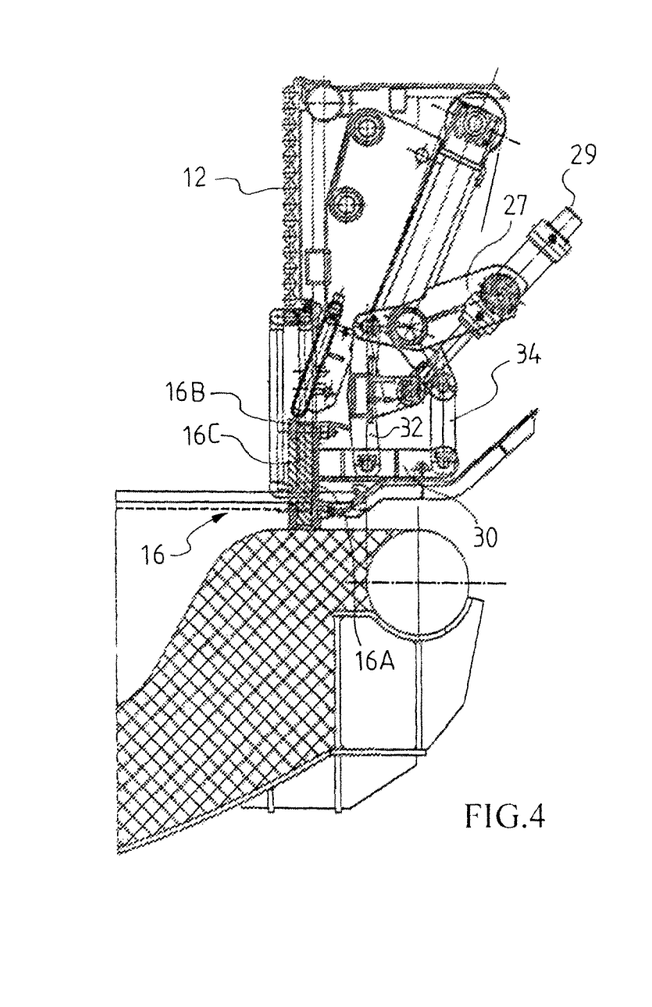
Figure 7:
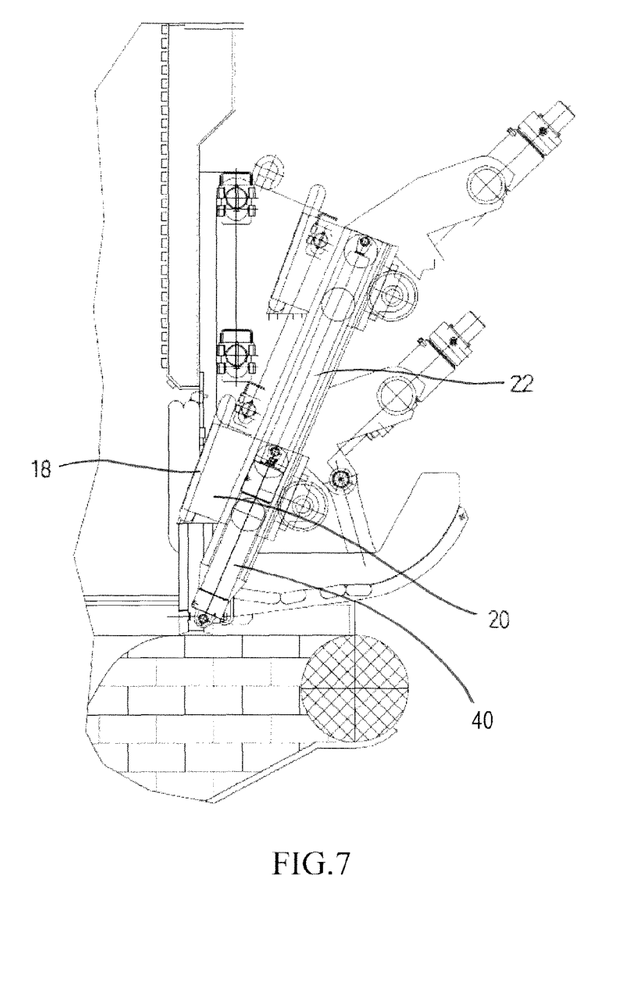
FIG. 7 shows in a side elevation and in cross-section the closing and opening apparatus of the arc metallurgic furnace slagging door according to a further embodiment.

The top panel 18 is mounted on a carrier 20, which slides on guides 22. The carrier 20 is moved by an actuator, which, in an purely exemplary embodiment, can comprise two equal side rising and lowering systems, each formed by a chain 21, which slides on gear rings 23 and 25, and which is connected, on one side, to a lever 27 articulated on the cylinder 29, and, on the other side, on the carrier 20 (FIG. 4). The gear rings are connected by a drive shaft, which makes their movements integral and synchronous. The drive shaft is preferably actuated by a unit comprising a motor and a gear reducer. According to a further embodiment, the carrier 20 is operated by one or more cylinders connected to the carrier 20 itself (FIG. 7). The top panel 18 can pass from a closing position (FIG. 1A) to an opening position (FIG. 1B), being able to assume also intermediate positions.

Figure 1A:
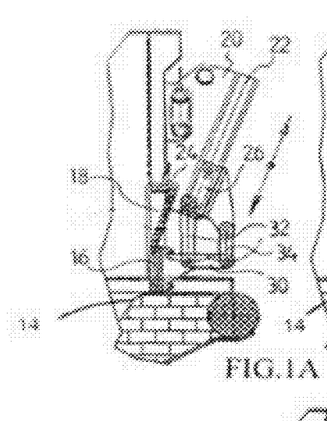
FIGS. 1A-1H show in a side elevation and in cross-section a mere exemplary embodiment of a closing and opening apparatus of an arc metallurgic furnace slagging door in several steps of separating the slag splashed on the dual lower panel of the slagging door and removing the slag from the furnace.
Figures 1B, 1C:
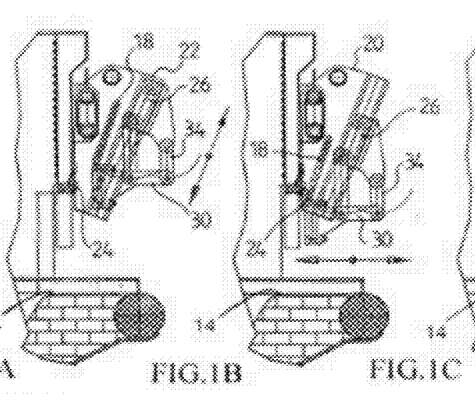

When the top panel 18, supported by the carrier 20, passes from the closing to the opening positions, the inclined translation movements upwards and outwards in respect to the inner wall of the furnace cause the slag to separate therefrom, splashed thereon during the melting operation, as a result of the scraper 24 dragging in the vicinity of the plane 18 surface, whereby the top panel 18 is cleared from the slag eventually deposited.

The lower panel 16 can comprise a single copper wall, eventually ceramic-coated. According to a particular exemplary, but not limitative, embodiment, illustrated in the accompanying drawings, the lower panel 16 is, in this case, formed by an outer wall 16A and an inner wall 16B, facing and separated to each other by a coil 16C of water cooling pipe. Both walls 16A and 16B are made of metal, preferably copper, eventually with a ceramic coating. The inner face of the panel 16, of course, has to be able to withstand the contact with the slag and prevent the slag from adhering. The lower part of the panel 16 is provided with metal elements, preferably made of steel, having the function of cleaning, since they will act on the slag for the removal thereof and it is susceptible of carrying out a movement for pushing and moving away the slag, which remain on the slagging door plane.

The lower panel 16 is capable of carrying out a composite movement, similar to the one carried out by a dredger, under the command of any hydraulic actuator, for example, a cylinder or a brake hydraulic motor. However, such an actuator is represented in the annexed drawings and it will be disclosed in the form of a central hydraulic cylinder 35 in an exemplary embodiment thereof. The panel 16 is supported by an articulation lever parallelogram comprising a bracket 30, on which two levers are pivoted, spaced to each other and of different length 32 and 34. The shorter lever 34 is pivoted on the slider 26, to which also the longer lever 32 is pivoted. Shifting the slider 26, along the upwards and outwards inclined guide 22, causes the lower panel 16, and consequently the parallelogram formed by the several levers, to assume several positions. In every position, the panel 16 can be moved independently from the top panel 18, assuming closing, cleaning and slagging positions. When the lower panel 16 is subjected to a slag dredging movement, the top panel 18 remains still in the closing position.

The scraping operation can be horizontally carried out, both from left to right (removal of the slag) and from right to left (cleaning, i.e. pushing inwards the material to be moved into the melting pot). The actuators are protected by the heat radiation and powder, as they work in a protective closed environment.

The operation of the apparatus as a slag removing device will be now disclosed.

From the position in FIG. 1A (Operation 1) with a closed slagging door one passes to the one in FIG. 1B (Operation 2) with maximum opening of the slagging door, employing the main hydraulic actuator 29, which implements a quick translation of the entire slagging door until the maximum opening.

The movement of the lower panel 16 is implemented according to a different axis from the top panel axis. During such an operation, the lower panel moves away from the stack wall and the underlying short tunnel, allowing an easy separation of slag, possibly, stuck on the tunnel, thereby enabling an easy opening of the slagging door (FIG. 1C) with the half-open slagging door (Operation 3), wherein the lower and top panels 16 and 18 are in an intermediate vertical position, with the lower panel 16 closing the top part of the slagging door. Such a movement is carried out by the main actuator, by operating, for example, the pair of cylinders 29 for moving the top panel, with the consequent partial opening of the entire slagging door, until a position required by the operator is reached.

Figure 1D:
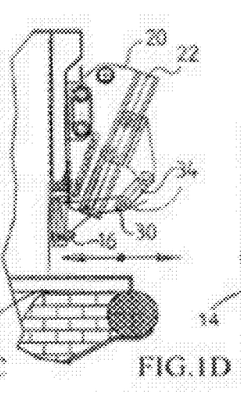

FIG. 1D shows a possible movement of the lower panel 16 (Operation 4) starting from the closing position.

Figure 1E:
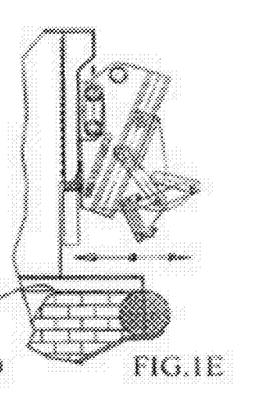

FIG. 1E (Operation 5) shows the lower panel 16 moving from the closing position to the opening position. This position is used only for removing skull.

Figure 1F:
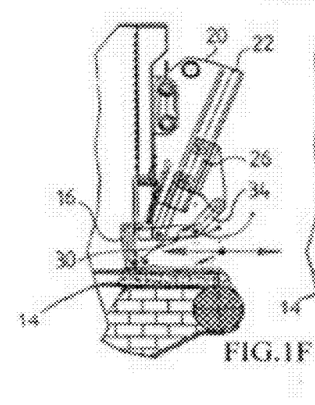
Figure 1G:
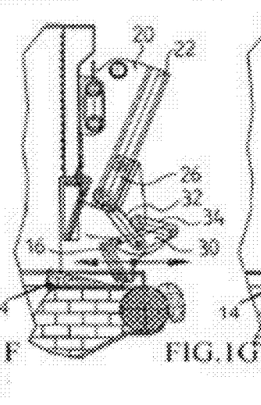
Figure 1H:
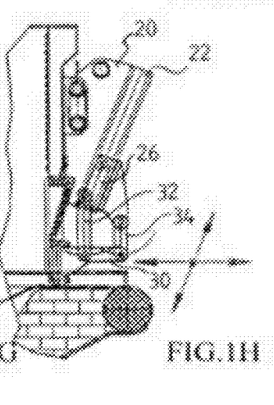
Figure 2:
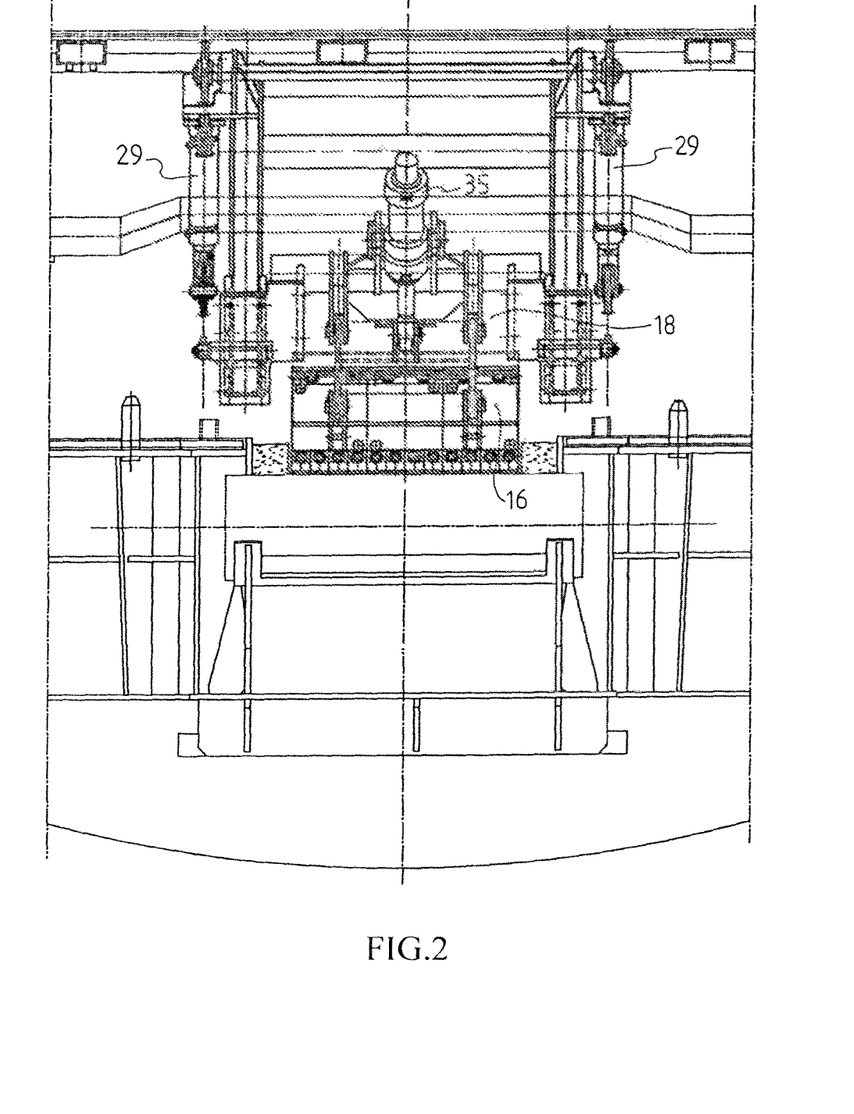
FIG. 2 shows an elevational front view of said closing apparatus of the slagging door.
Figure 3:
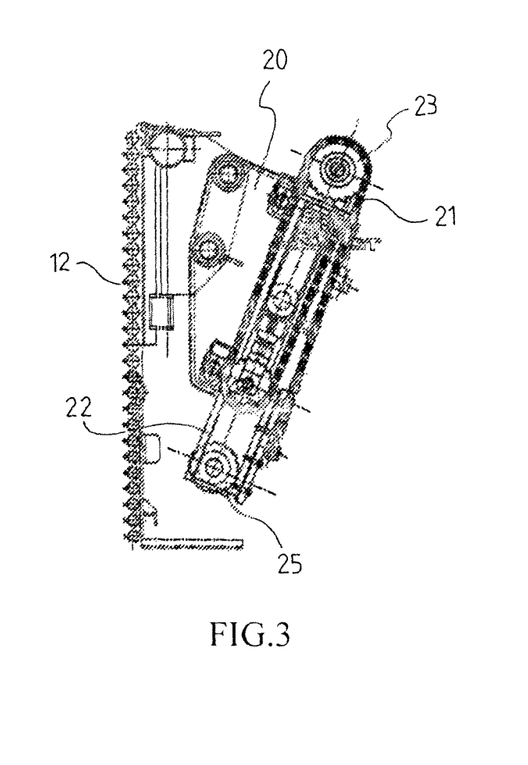
FIGS. 3 and 4 show a side and a cross-sectional elevational views, respectively, of the chain and gear ring drive for operating the panels and the lever parallelogram, which operates the dual lower slagging panel.

In FIGS. 1F and 1G (Operations 6 and 7 of the cleaning cycle) the main actuator lowers the lower panels 16, to start a cleaning operation, pushing forward (FIG. 1F) or backward (FIG. 1G) the cleaning lower panels 16. This movement is carried out by the lower cylinder. Finally, after operations 6 and 7 have been repeated several times, or until the desired result of slag removal has been achieved, it returns to the starting position, represented in FIG. 1H. Such a cycle can be implemented at different heights and positions. The command for carrying out the slag removal can be manually or automatically implemented.

By manually commanding, the operator drives the door, carrying out the slag scraping or dredging, causing the lower panel to remain in contact with the slag, in order to prevent it from hitting the frame, that is, preventing the single cylinder 35 from being extracted, when the sliding carrier, on which the linkage is mounted, is above a certain height.

An automatic cleaning cycle is adopted in order to avoid erroneous or dangerous operations and such a cycle is operable only after the top panel is completely open. It includes the following steps:

1—Approaching the lower panel 16, until it contacts the slag, signalled by an encoder and by a pressure sensor;

2—Releasing said slagging panel 16, when contacting the slag;

3—Removing said slagging, by actuating the single cylinder in retraction;
4—Slightly rising and completely extracting the single cylinder;
5—Releasing the slagging panel when contacting the slag;
6—Second removal of the slag, operating the dual cylinder in retraction;
7—Repeating steps 5, 6 and 7, until the slag has been completely removed, by moving to the closing position of the slagging door.

Analogously an automatic cycle of scrap pushing inside the furnace can be adopted, which comprises the following steps:
1—Positioning the lower panel 16 in the closing position maintaining the top panel 18 in the opening position or in a position close to the opening position;
2—Inserting the lower panel 16 inside the furnace pushing the eventually accumulated scrap;
3—Returning the lower panel 16 in the position of step 1;
4—Lowering the top panel 18 in the closing position or in a position close to the closing position;
5—Inserting the lower panel 16 inside the furnace pushing the eventually accumulated scrap;
6—Returning the lower panel 16 in the position of step 3.

It is to be noted that the movement downward occurs as a result of gravity (even if a suitable drive hydraulic system may be provided), which allows the slagging door to be closed, also when part of the slag remains on the slagging door plane. The pair of cylinders 29 of the hydraulic drive actuator system of the top panel is actuated by a single proportional valve. The single cylinder, which drives the lower panel of the slagging door, is driven by a single proportional valve.

A further advantage of the present invention is represented by the possibility to control the slag leakage from the furnace, particularly during the production of a foamy slag, i.e. CO-bubble filled slag from the fine carbon oxidation, injected in a bath, simultaneously with an injection of oxygen, with a substantially horizontal furnace, acting on the opening degree of the lower panel 16, in order to guarantee a controlled leakage of the slag, whereby the lower panel 16 acts as a sort of valve for controlling the leaking slag flow.

It is also to be noted that, setting up this apparatus requires the presence of a tunnel on the furnace wall. This tunnel will have a depth equal to the diameter of about 180 mm, which is about twice the diameter of a cooling pipe.

Figure 5A:
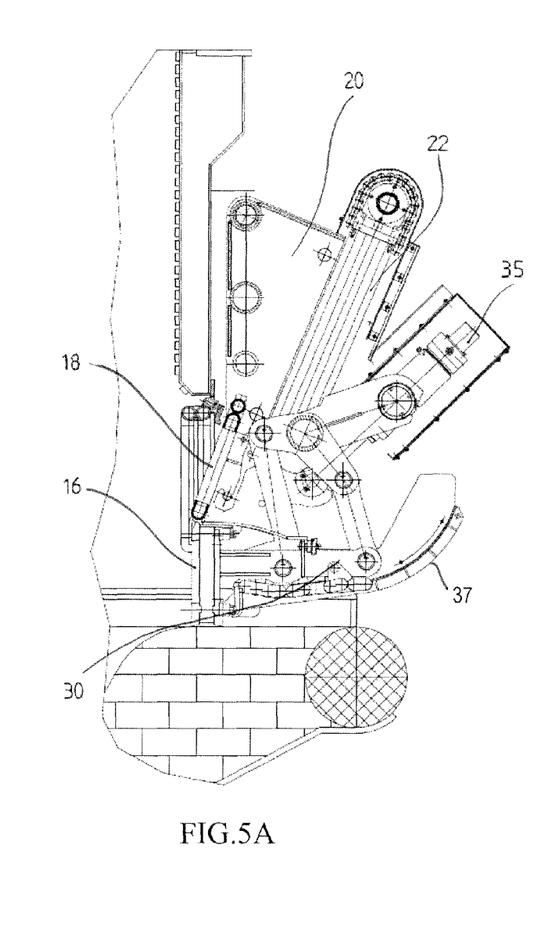
FIGS. 5A-5B show in a side elevation and in cross-section a further exemplary embodiment of a closing and opening apparatus of an arc metallurgic furnace slagging door in various steps of movement.
Figure 5B:
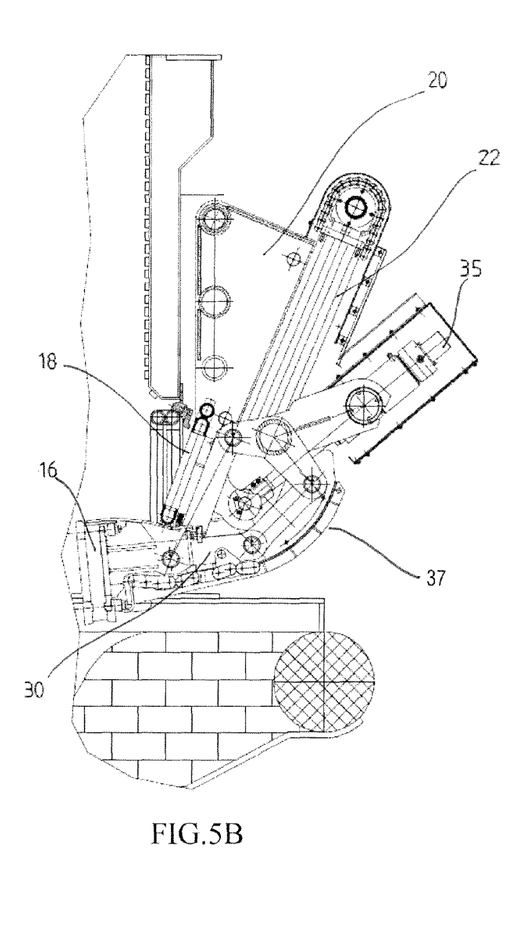

As previously said, the movement of the lower panel 16, when directed from the interior towards the exterior of the furnace, can be advantageously used for removing slag eventually accumulated at the tunnel or the not completely molten scrap by pushing it inside the furnace into the melting pot. This aspect can be better understood referring to FIGS. 5A-5B. In FIG. 5A, both the lower panel 16 and the top panel 18 are in the closing position. By operating the hydraulic actuator 35 controlling it, it is possible to cause the lower panel 16 to move towards the interior of the furnace, i.e. from right to left in FIG. 5A. As a consequence of this movement, the lower panel moves towards the interior of the furnace along the tunnel (FIG. 5B). The lower panel follows the same trajectory which it follows during the movement which has been described whit reference to the use as a slag remover device, i.e. similar to that of a dredger. In this manner, slag or scraps which eventually have remained at the tunnel, are pushed into the melting pot and can be molten therein. It is to be noted that the lower panel 16 is able to follow inside the furnace from the closing position a long distance path. Preferably, it can enter the furnace by 500-600 mm from the closing position.

Figure 6:
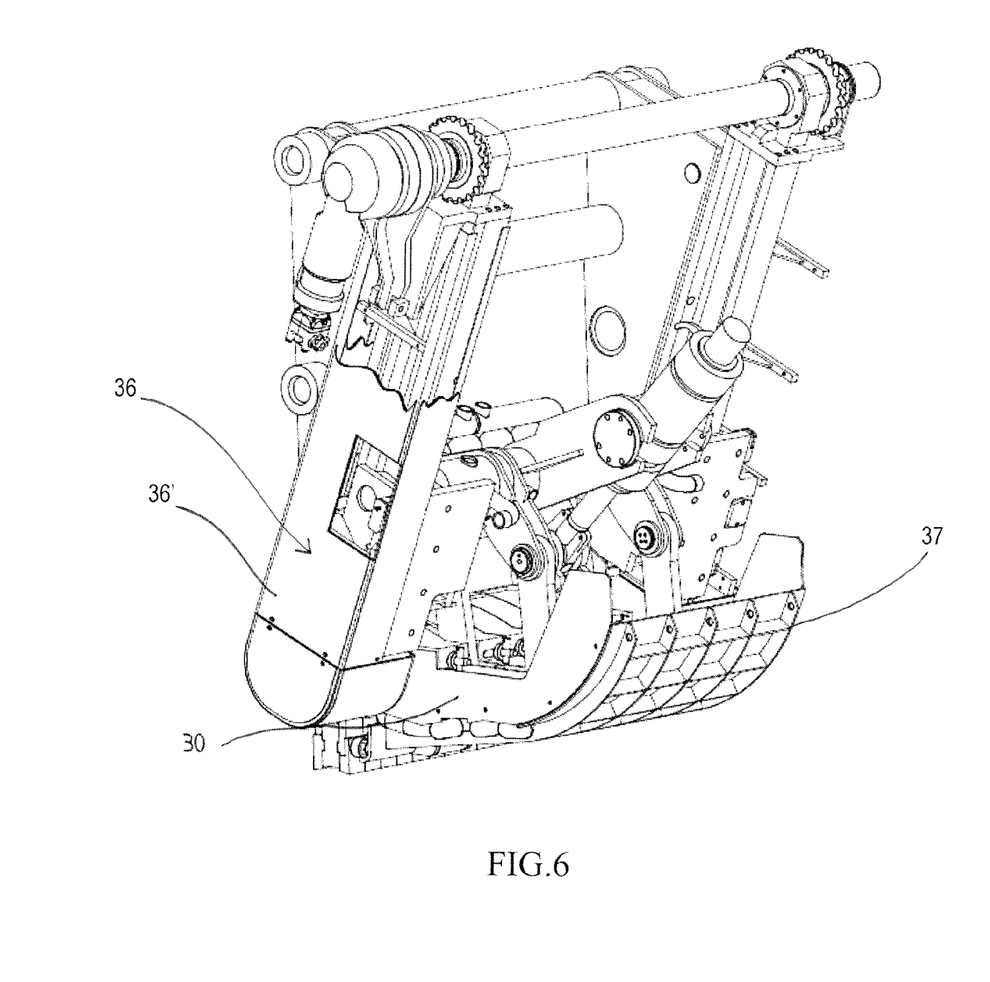
FIG. 6 shows in a perspective view a metallurgic furnace comprising a slagging door according to a further exemplary embodiment of the invention.

According to an embodiment, the top panel 18 side rising and lowering systems are at least partially canned in casings 36, for example made of sheet metal (FIG. 6). Such a configuration avoids encrustations in the movement mechanisms of the top panel 18, for example due to molten material splashes or due to the slag itself, and therefore jams in the movement thereof. Particularly, the areas in which the relative movement between the top panel 16 carrier 20 and the inclined guide 22 occurs, at which suitable bearings can be provided (which preferably are arranged only in the outer sides of the inclined guides 22), are arranged inside casings 36', such that the zone in which the movement of the top panel occurs is not in contact with the outside, and so it is kept substantially without impurities. Preferably, the motor-gear reducer unit for the movement of the drive shaft which actuates the top panel 18 is housed inside a further casing.

According to a possible embodiment, also the cylinder 35 actuating the lower panel 16 is canned inside a further casing.

According to a possible embodiment of the invention, the lower panel 16 is rearly water-cooled. To this purpose, a cooling shield 37 can be provided which is associated to the lower panel. This cooling shield 37 can comprise loopholes suitable to allow dust or dirt eventually accumulated thereon to fall and to be eliminated.

It is evident that only some particular embodiments of the subject electric furnace of the present invention have been disclosed, to which those skilled in the art will be able to make all the necessary modifications to adapt it to particular applications, moreover without departing from the scope of protection of the present invention defined in the following claims.

The invention claimed is:

1. A slagging door for an arc metallurgic furnace having a furnace wall, a melting pot, and a tunnel to receive molten metal, and, the slagging door comprising:
  a carrier connected to the arc metallurgic furnace;
  a guide supported by the carrier and which is outwardly inclined with respect to the furnace wall;
  an upper panel mounted on the carrier and which is slidingly movable upwardly and outwardly on the guide between a closed position, and an open position which permits remarks and interventions to be conducted on the molten metal, and intermediate positions;
  a lower panel connected to the upper panel, and movable relative to the tunnel between a closing position, a cleaning position, and a slagging position, and also movable to partially rise, partially lower, partially advance into the arc metallurgic furnace, and partially back out of the arc metallurgic furnace to both remove slag present in the melting pot, and push various material inside the arc metallurgic furnace;
  a first actuator connected to the carrier and the upper panel to drive the upper panel between the closed position, the open position, and the intermediate positions; and
  a second actuator connected to the carrier and the lower panel to drive the lower panel between the closing position, the cleaning position, and the slagging position.

2. The slagging door of claim 1, wherein the upper panel and the lower panel are selectively movable independently of each other.

3. The slagging door of claim 1, wherein the upper panel and the lower panel are selectively movable simultaneously.

4. The slagging door of claim 1, wherein the lower panel comprises an inner metal wall and an outer metal wall, between which a coil of one of a cooling pipe and a cooling duct is arranged.

5. The slagging door of claim 4, further comprising a metal scraper at a lower part of the outer wall.

6. The slagging door of claim 4, wherein the lower panel is supported by a lever parallelogram comprising a bracket, first and second levers having first ends which are pivotally connected to the bracket, and second ends which are pivotally connected to the carrier.

7. The slagging door of claim 1, wherein said lower panel comprises one of a copper wall and a steel wall coated with a ceramic material at least on one side thereof.

8. The slagging door of claim 7, wherein a lower part of the lower panel has metal scrapers.

9. The slagging door of claim 1, wherein said lower panel is moveable towards a position inside the furnace so as to act as one of a slag pusher and a scrap pusher.

10. A slagging door for an arc metallurgic furnace having a furnace wall, a melting pot, and a tunnel to receive molten metal, and, the slagging door comprising:
a carrier connected to the arc metallurgic furnace;
a guide connected to the carrier at an incline relative to the furnace wall;
an upper panel mounted on the guide for movement in upward and downward directions relative to the tunnel and between a closed position, and an open position which permits remarks and interventions to be conducted on the molten metal, and intermediate positions;
a lower panel operatively connected to the upper panel, and movable relative to the tunnel between a closing position, a cleaning position and a slagging position, and also movable to partially rise, partially lower, partially advance into the arc metallurgic furnace, and partially back out of the arc metallurgic furnace to both remove slag present in the melting pot, and push various material inside the arc metallurgic furnace;
a first hydraulic actuator to drive the upper panel, the first hydraulic actuator having at least one hydraulic cylinder operatively connected to the upper panel; and
a second hydraulic actuator to drive the lower panel between the closing position, the cleaning position, and the slagging position.

11. The slagging door of claim 10, wherein the at least one hydraulic cylinder is operatively connected to a lever which is connected to an end of a chain passing over a pair of gear rings, with the other end of said chain being secured to the carrier.

12. The slagging door of claim 10, further comprising a lever parallelogram to connect the second hydraulic actuator to said lower panel.

13. The slagging door of claim 12, wherein the lever parallelogram comprises a bracket, and first and second levers having first ends which are pivotally connected to the bracket, and second ends which are pivotally connected to the carrier.

14. The slagging door of claim 13, wherein the upper panel carries out a cycle of movements toward the interior of the furnace, in contact with the slag, and away from the interior of the furnace to remove the slag.

15. The slagging door of claim 14, wherein said upper panel is adapted to carry out said cycle a plurality of times until a complete removal of the slag, a completion of said cycle being effectuated by the upper panel being moved to the closed position for closure of an entrance to the tunnel.

16. The slagging door of claim 10, wherein the upper panel and the lower panel are selectively movable independently with respect to each other.

17. The slagging door of claim 10, wherein the upper panel and the lower panel are selectively movable simultaneously.

18. The slagging door of claim 10, wherein said lower panel comprises an inner metal wall and an outer metal wall, between which a coil of one of a cooling pipe and a cooling duct is arranged.

19. The slagging door of claim 10, wherein said lower panel is moveable towards a position inside the furnace so as to act as one of a slag pusher and a scrap pusher.

20. A furnace, comprising:
a furnace melting pot;
a furnace wall;
a tunnel; and
a slagging door including:
a carrier connected to the furnace wall;
a guide connected to the carrier and which is outwardly inclined with respect to the furnace wall;
an upper panel mounted on the guide for movement between a closed position, and an open position which permits remarks and interventions to be conducted on the molten metal, and intermediate positions;
a lower panel operatively connected to the upper panel, and movable relative to the tunnel between a closing position, a cleaning position and a slagging position, and also movable to partially rise, partially lower, partially advance into the arc metallurgic furnace, and partially back out of the arc metallurgic furnace to both remove slag present in the melting pot, and push various material inside the arc metallurgic furnace;
a first actuator connected to the carrier and the upper panel to drive the upper panel between the closed position, the open position, and the intermediate positions; and
a second actuator connected to the carrier and the lower panel to drive the lower panel between the closing position, the cleaning position, and the slagging position.

* * * * *